United States Patent [19]
Lehuen et al.

[11] 3,781,581
[45] Dec. 25, 1973

[54] INTERNAL ARRANGEMENT OF ROTOR SLOTS OF ELECTRIC MACHINES

[75] Inventors: Christian Lehuen, Cravanche; Roger Gillet, Belfort, both of France

[73] Assignee: Societe Generale de Constructions Electriques et Mecaniques (Alsthom), Paris, France

[22] Filed: Jan. 5, 1972

[21] Appl. No.: 215,574

[30] Foreign Application Priority Data
Jan. 13, 1971 France .............................. 71.01066

[52] U.S. Cl. .................... 310/215, 310/61, 310/214
[51] Int. Cl. ............................................. H02k 3/36
[58] Field of Search ............... 310/61, 64, 43, 65, 310/52, 58, 214, 217, 215, 218, 216

[56] References Cited
UNITED STATES PATENTS

| | | | |
|---|---|---|---|
| 2,664,512 | 12/1953 | Huntley | 310/64 |
| 2,990,486 | 6/1961 | Willyoung | 310/214 |
| 1,221,013 | 4/1917 | Avel | 310/65 |
| 3,119,033 | 1/1964 | Horsley | 310/64 |
| 2,661,434 | 12/1953 | Kilbourne | 310/64 |

*Primary Examiner*—R. Skudy
*Attorney*—Flynn & Frishauf

[57] ABSTRACT

An internal arrangement of rotor slots for electrical machines, such as turboalternators, in which stacked conductors are carried by the slots and insulating cover caps of the slots have spacing members that protrude on the sides of the conductors to form ventilating channels between the conductors and the cover caps.

6 Claims, 6 Drawing Figures

INTERNAL ARRANGEMENT OF ROTOR SLOTS OF ELECTRIC MACHINES

The present invention relates to an internal arrangement of rotor slots of electric machines, especially of turbo alternators, relating to the cooling of the rotor.

It relates more particularly to a structure which permits circulation of cooling gas in a channel provided between a lateral wall of the slot and the electric conductors put in that slot. Such a circulation can be used for its own cooling effects and/or to allow the flow of the cooling gas within the conductors themselves. The connection between the outside of the rotor and the channels provided along the lateral walls of the slots can be effected for instance at the axial ends of the rotor or in the air gap. In the latter case, the introduction of the gas into the rotor can be provided by direct gas connections commonly called "pick-up."

To provide ventilation channels between the conductors and the lateral walls of a slot, while keeping accurate alignment or position of the coils, it is possible to cut out laterally the conductors, but this would entail high machining costs and a loss of the costly material made up by the conductors.

An object of the present invention is to allow the use of conductors with parallel rectilinear edges as they are provided by the rolling and drawing steps, without further machining.

Another object is to provide insulating spacing members firmly held in place, to positively locate the coils in the slots and provide ventilating channels of strictly constant cross section.

Other objects of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUBJECT MATTER OF THE INVENTION

Electrically insulating spacing members are fastened to or incorporated in the insulating cover cap, and protruding on the side of the conductors to form ventilating channels between the latter and the insulating cover caps.

The materials to be used for the cover cap and the spacing members are preferably stratified materials, for example of fiberglass and epoxy resins.

The provision of spacing members fastened to the cover cap can be effected in several ways. For instance, the cover cap can be a goffered or embossed sheet of which the parts protruding on the side of the conductors make the insulating spacing means. The latter can be formed by members glued to a conventional cover cap, plane or not plane. They can also be obtained by direct moulding on an insulating cover cap.

The ventilation channels formed by the spacing means can be combined with channels for the cooling gas within the conductors. The latter can be cut radially or diagonally; for example grooved conductors, may be used and transverse channels connecting the ventilating channels situated on either side of the bulk of the conductors within a slot.

In such a system with transverse channels in the conductors, it is advantageous to feed the ventilating channels through the air gap and to put the insulating spacers along radial lines.

There are described hereinafter examples of embodiments of the invention by reference to the figures of the drawing.

Figure 1:
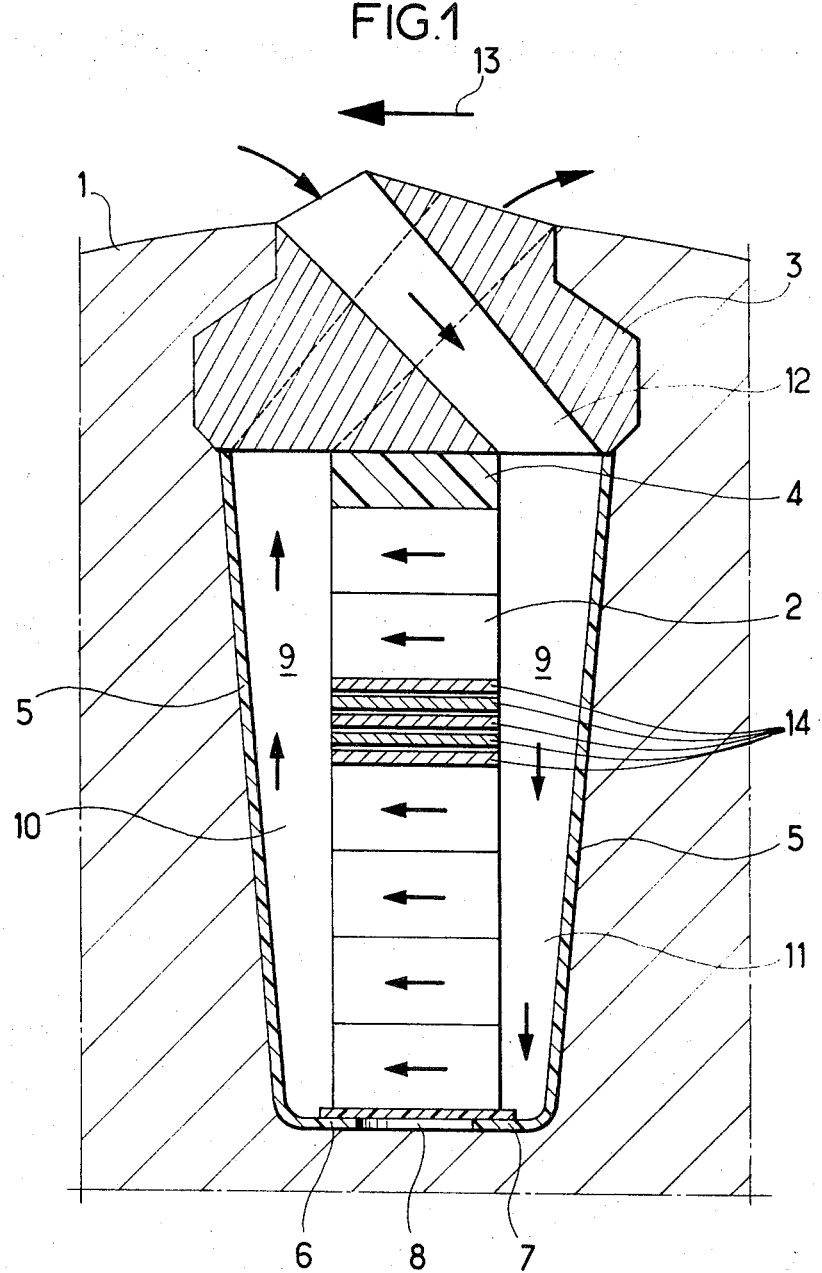
FIG. 1 shows a transverse cross-sectional view through a slot.
Figure 2:
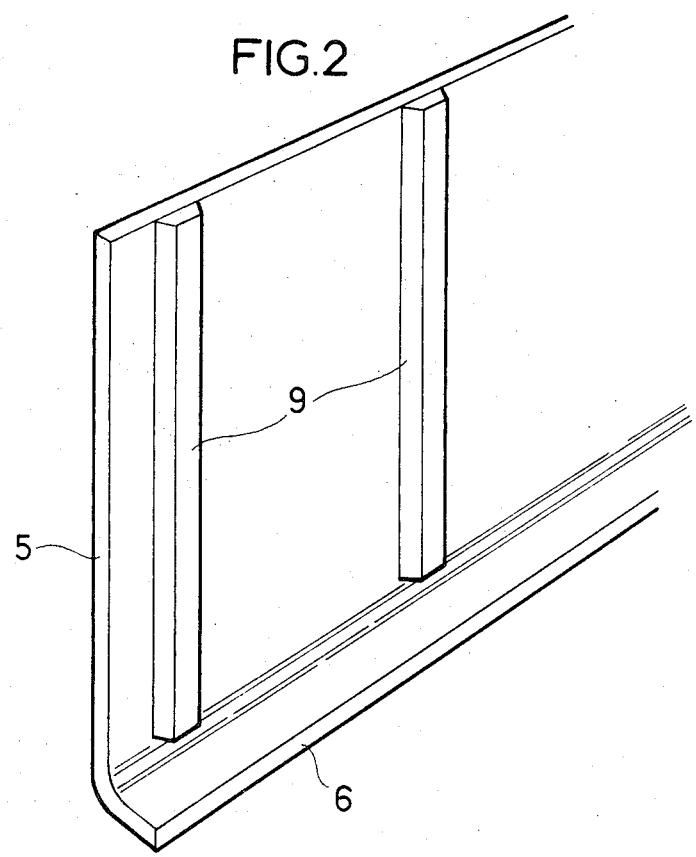
FIG. 2 shows a perspective view of an insulating cover cap with spacers.

In FIG. 1, a slot is cut in the magnetic circuit 1 of a rotor of an electric machine such as a turboalternator. The slot contains a pack of seven conductors 2 and it is closed by a wedge 3. An insulating member 4 is inserted between the conductors 2 and the wedge 3. The insulation in respect of the body of the conductors is provided by insulating cover caps 5 applied against the walls of the slot and continued in the bottom of the slot by curved parts 6 and 7 covered by a seal cover 8. Between the cover caps 5 and the pack of conductors 2 are successive spacers 9 fastened to the cover caps, as can be seen on FIG. 2 which shows part of a cover cap.

Figure 3:
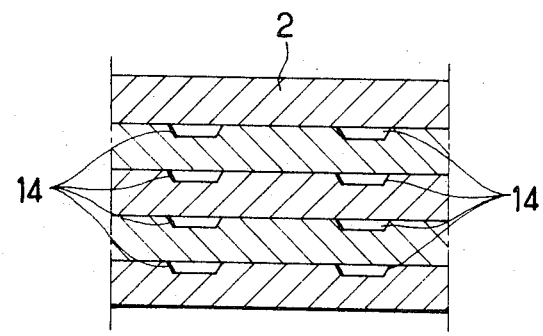
FIG. 3 shows a longitudinal cross-section of part of a conductor in the slot.

The spacers 9 define ventilating channels 10 and 11 lying on either side of the pack of conductors 2. The closing wedge 3 is provided with channels 12 allowing feeding of cooling gas during the rotation of the rotor in the direction of the arrow, into channels 11. Each conductor 2 is made up by five elementary conductors, four of which are grooved, as shown in FIG. 3, to form transverse channels 14 (FIG. 1). The cooling gas flows thus from channels 11 through channels 14 into channels 10 and flows out into the air gap by means of channels bored in the slot-shutting wedge 3, shown in dotted lines in FIG. 1.

There has been shown in the figures only one sheet of cover cap, but there could also be several superimposed ones, the outer one of which supports then the spacers 9. Although one of the advantages of the invention is to avoid the lateral cutting out of the conductors, it is possible to combine the latter with the insulating spacers 9 to enlarge the volume of channels 10 and 11.

Figure 4:
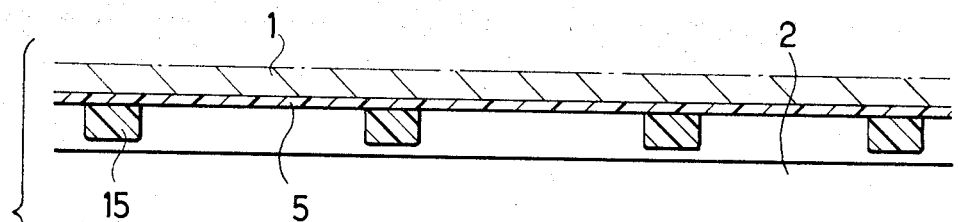
FIG. 4, 5 and 6 show longitudinal cross-sectional views of three examples of cover caps and spacers embracing a conductor.
Figure 5:
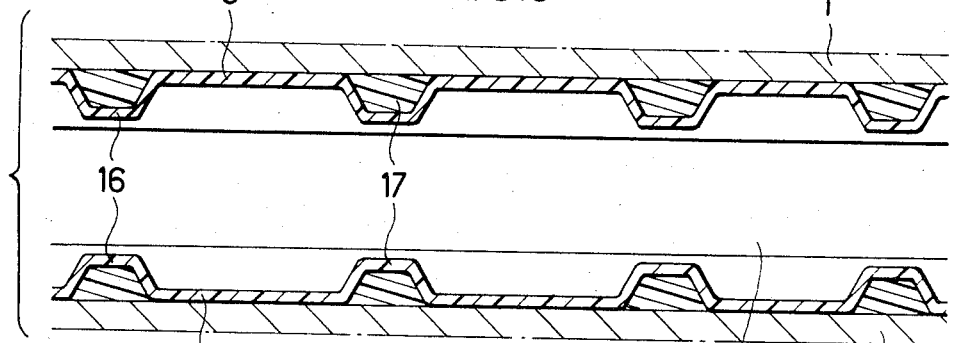

The spacers 9 can be made up by insulating members 15 glued on the cover caps 5, as shown in FIG. 4. They could also be cut from the mass of the insulating cover caps. In the example of FIG. 5, the insulating cover caps are made up by a goffered sheet the protuberances 16 — on the side of the conductors — of which make up the spacers and the corresponding depressions 17 — on the opposite side from the conductors — of which can be filled with an insulating material, as shown.

Figure 6:
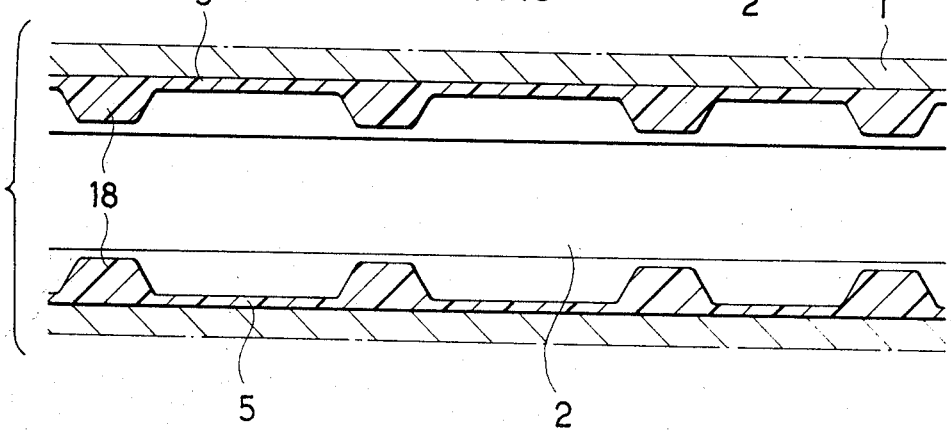

In the case of FIG. 6, the spacers are made up by insulating masses 18 directly moulded on the cover caps.

We claim:

1. An internal arrangement of rotor slots of electric machines, in which electric conductors are stacked in each slot and an insulating cover cap is provided fitted against each of both lateral slot walls in front of the conductors to insulate the stacked conductors from the slot wall, each said cap comprising an insulating sheet, and spaced insulating protrusions which, protrude from the sheet facing the sides of the conductors to form, between the conductors and the insulating cover cap, ventilating channels and to space the sheet from the conductors.

2. Internal arrangement according to claim 1, wherein the sheet is embossed, the parts of the sheet which protrude on the side of the conductors forming the insulating spacers.

3. Internal arrangement according to claim 2, wherein the depressed parts of the insulating cover cap on the side opposed to the conductors are filled with an insulating material.

4. Internal arrangement according to claim 1, wherein the insulating spacers are strips adhered upon the insulating cover cap sheet.

5. Internal arrangement according to claim 1, wherein the sheet and the protrusions are a unitary molding.

6. Internal arrangement according to claim 1, wherein the conductors are provided with transverse channels extending between opposite sides of the conductors and connecting said ventilating channels lying on either side of the pack of conductors in the slot.

* * * * *